US012023681B2

(12) United States Patent
Xiao et al.

(10) Patent No.: US 12,023,681 B2
(45) Date of Patent: Jul. 2, 2024

(54) CLASSIFIED LANDFILL DEVICE AND METHOD FOR GARBAGE LANDFILLS

(71) Applicant: SICHUAN KEYUAN TESTING CENTER OF ENGINEERING TECHNOLOGY CO., LTD, Chengdu (CN)

(72) Inventors: Guangli Xiao, Chengdu (CN); Xi Han, Chengdu (CN); Minghui Qi, Chengdu (CN); Qiang Xu, Chengdu (CN); Xinyue Hao, Chengdu (CN); Zhen Long, Chengdu (CN)

(73) Assignee: SICHUAN KEYUAN TESTING CENTER OF ENGINEERING TECHNOLOGY CO., LTD, Chengdu (CN)

( * ) Notice: Subject to any disclaimer, the term of this patent is extended or adjusted under 35 U.S.C. 154(b) by 0 days.

(21) Appl. No.: 18/470,654

(22) Filed: Sep. 20, 2023

(65) Prior Publication Data

US 2024/0091786 A1 Mar. 21, 2024

(30) Foreign Application Priority Data

Sep. 20, 2022 (CN) ........................ 202211141898.5

(51) Int. Cl.
*B02C 18/08* (2006.01)
*B02C 18/00* (2006.01)
(Continued)

(52) U.S. Cl.
CPC ...... *B02C 18/2241* (2013.01); *B02C 18/0092* (2013.01); *B02C 18/10* (2013.01); *B02C 23/08* (2013.01); *B02C 2018/164* (2013.01)

(58) Field of Classification Search
CPC ..... B02C 18/0092; B02C 18/08; B02C 18/06; B02C 18/142; B02C 18/2241; B02C 2018/164
See application file for complete search history.

(56) References Cited

U.S. PATENT DOCUMENTS 3,703,970 A * 11/1972 Benson ................ B02C 18/145
241/243

FOREIGN PATENT DOCUMENTS

CN 107321756 A * 11/2017 ............. B02C 18/06
CN 107876162 A * 4/2018 ......... B02C 18/0092
(Continued)

OTHER PUBLICATIONS

CN 202211141898.5—Notification to Grant Patent Right for Invention, dated Apr. 18, 2023, 2 pages. (with English translation).

*Primary Examiner* — Faye Francis
(74) *Attorney, Agent, or Firm* — Getech Law LLC; Jun Ye

(57) ABSTRACT

The present invention relates to the field of garbage landfill. The present invention discloses a classified landfill device and method for garbage landfills, and the problem solved by the present invention is that the device proposed in the above background absorbs metals in the garbage using a magnet, but when the surface of the magnet has absorbed a large amount of metal, the device needs to be closed to treat the metal adsorbed on the surface of the magnet. The present invention comprises a screening mechanism, crushing mechanism and discharge mechanism. According to the classified landfill device and method for garbage landfill, the second crushing knife is set at an angle to divert the falling garbage to the front and rear sides, so that the two first crushing knives and the second crushing knife cooperate to crush the garbage respectively to avoid excessive accumulation of garbage.

5 Claims, 5 Drawing Sheets

(51) Int. Cl.

| | |
|---|---|
| ***B02C 18/10*** | (2006.01) |
| ***B02C 18/22*** | (2006.01) |
| ***B02C 23/08*** | (2006.01) |
| *B02C 18/16* | (2006.01) |

(56) References Cited

FOREIGN PATENT DOCUMENTS

| | | | | | |
|---|---|---|---|---|---|
| CN | 108355789 | A | * | 8/2018 | ......... B02C 18/0092 |
| CN | 109530036 | A | * | 3/2019 | ......... B02C 18/0092 |
| CN | 109622157 | | * | 4/2019 | ......... B02C 18/0092 |
| CN | 111250228 | | * | 6/2020 | ......... B02C 18/0092 |
| CN | 111672597 | A | * | 9/2020 | ......... B02C 18/0092 |
| CN | 113000152 | | * | 6/2021 | ......... B02C 18/0092 |
| CN | 113457800 | A | * | 10/2021 | ......... B02C 18/2241 |
| CN | 113509990 | A | * | 10/2021 | ........... B02C 18/142 |
| CN | 20150017209 | A | * | 10/2021 | ........... B02C 18/142 |
| KR | 20070098274 | | * | 10/2007 | ............. B02C 18/06 |
| KR | 101808952 | B1 | * | 12/2017 | ............. B02C 18/06 |

* cited by examiner

CLASSIFIED LANDFILL DEVICE AND METHOD FOR GARBAGE LANDFILLS

TECHNICAL FIELD

The invention relates to the field of garbage landfill, in particular to a classified landfill device and method for garbage landfills.

BACKGROUND

Garbage landfill is still the most important way to treat domestic waste in most cities of China, and 85% of urban domestic waste is landfilled. In view of the completeness of engineering measures and compliance with environmental protection standards, it is classified into three types: simple landfill, controlled landfill and sanitary landfill. Landfill generally requires the use of classified landfill devices.

The existing patent (Announcement No.: CN113000152A) discloses a classified landfill method and a sorting device for garbage landfills and relates to the technical field of garbage landfill. The classified landfill method for garbage landfills includes six steps of unloading, sorting, crushing, site excavation, inert landfill and sanitary landfill. In the process of realizing the present invention, the inventor found that at least the following problems in the prior art have not been solved: 1. The device absorbs metals in the garbage using magnet, but when the surface of the magnet has absorbed a large amount of metal, the device needs to be closed to treat the metal adsorbed on the surface of the magnet.

SUMMARY

The purpose of the present invention is to provide a classified landfill device and method for garbage landfills, which can solve the problem that the device proposed in the above background absorbs metals in the garbage using magnet, but when the surface of the magnet has absorbed a large amount of metal, the device needs to be closed to treat the metal adsorbed on the surface of the magnet. To achieve the above purpose, the present invention provides the following technical solution: A classified landfill device for garbage landfills, comprising the disposal box, characterized in that: the front of the disposal box is fixedly connected with the screening mechanism; the side drive of the screening mechanism is connected with the crushing mechanism, and the bottom drive of the crushing mechanism is connected with the discharge mechanism.

The front and rear sides of the inner wall of the disposal box are fixedly connected with deflectors.

Preferably, the screening mechanism comprises a two-way motor and round rod, of which the front and rear ends of the round rod are rotatably connected with the front and rear sides of the inner wall of the disposal box respectively, and the two-way motor is fixed on the front of the disposal box; one end of the rotating shaft of the two-way motor extends to the inside of the disposal box and is fixedly connected with the double-thread worm; the sides of the double-thread worm and the round rod are sleeved with the drive belt, and the drive belt is internally provided with magnet.

The sides of the double-thread worm and the round rod are fixedly sleeved with the drive wheel, and the two drive wheels are engaged with each other.

The insides of the two drive belts are overlapped with rotating rods, and the two ends of the rotating rods are rotatably connected with the front and rear sides of the inner wall of the disposal box respectively; the lateral movable sleeve of the drive belt is provided with clamping plate, and the front and rear sides of the clamping plate are fixedly connected with the front and rear sides of the inner wall of the disposal box respectively.

Preferably, the crushing mechanism comprises the drive rod, and the side of the drive rod is fixedly sleeved with the worm gear; the side of the worm gear is engaged with the double-thread worm, and the side of the drive rod is rotatably connected with the inner wall of the disposal box; the side of the drive rod is fixedly connected with the first crushing knife.

Preferably, the discharge mechanism comprises a stirring rod, and the side of the stirring rod is rotatably connected with the side of the clamping plate; the side of the stirring rod and the side of the drive rod at the front side are sleeved with the belt, and the side of the stirring rod is fixedly connected with the second crushing knife.

The bottom surface of the stirring rod is fixedly connected with the conveying hollow cylinder, and the bottom surface of the conveying hollow cylinder is rotatably connected with the conveying pipe; the conveying pipe is fixedly inserted on the bottom surface of the inner wall of the disposal box, and the side of the conveying pipe is rotatably connected with the reciprocating screw rod; the side of the reciprocating screw rod is provided with sealing plate, and the sealing plate is movably inserted on the side of the conveying pipe; the side of the reciprocating screw rod is fixedly sleeved with the one-way bearing, and the side of the one-way bearing is fixedly sleeved with the drive gear; the side of the drive gear is rotatably connected with the gear ring, and the ring gear is fixedly connected to the bottom surface of the conveying pipe.

Preferably, the left and right sides of the front of the disposal box are movably connected with the collection box, and the side of the collection box is overlapped with the side of the clamping plate.

Preferably, the clamping plate is L-shaped, and the inside of the clamping plate is provided with a chute.

Preferably, the side of the stirring rod is fixedly sleeved with the fixed bearing, and the outside of the fixed bearing is fixedly connected to the side of the clamping plate.

Preferably, the method for using a classified landfill device for garbage landfills comprises the following steps:

S1: Garbage that needs to be landfilled is conveyed to the inside of the disposal box; the two-way motor drives the double-thread worm counterclockwise, and then the drive wheel on the side of the double-thread worm drives the other drive wheel clockwise; the screw rotating rod turns the two drive belts in reverse respectively to slow down the flow rate of garbage conveyed to the disposal box into the conveying hollow cylinder, so that a certain time is reserved for the magnet to absorb metal in the garbage; then the metal absorbed by the magnet under the action of the drive belt is conveyed to the inside of the clamping plate, and the metal adsorbed by the magnet is accumulated inside through the clamping plate; when a larger amount of metal is accumulated, the adsorption force of the magnet for the metal located on the outside decreases, so that the metal falls into the collection box along the clamping plate.

S2: The garbage absorbed and screened by the magnet is conveyed to the upper side of the conveying hollow cylinder, and then the double-thread worm drives the two first crushing knives clockwise; at this time, the conveying hollow cylinder drives the gear ring clockwise, and then drives the drive gear counterclockwise; then, the outer ring of the one-way bearing rotates, but its inner ring does not rotate, in which case the reciprocating screw rod does not rotate; the front drive rod drives the stirring rod and the second crushing knife on its side, and the second crushing knife is set at an angle to divert the falling garbage to the front and rear sides so that the two first crushing knives and the second crushing knife cooperate to crush the garbage respectively to avoid excessive accumulation of garbage, otherwise the knife may be stuck; the crushed garbage falls into the conveying hollow cylinder, after the device has crushed the specified amount of garbage.

S3: The two-way motor that rotates counterclockwise drives the drive rod counterclockwise, so that the conveying hollow cylinder drives the gear ring counterclockwise; at this time, the outer and inner rings of the one-way bearing rotate at the same time, so that the reciprocating screw rod rotates and drives the sealing plate to move towards the left and open the conveying pipe; the broken garbage inside is discharged into the designated treated foundation pit for landfill, and then the reciprocating screw rod continues to rotate and resets the sealing plate to block the conveying pipe and complete the discharge of the device.

Compared with the prior art, the beneficial effects of the present invention are as follows:

In the present invention, the drive wheel on the side of the double-thread worm drives the other drive wheel clockwise; the screw rotating rod turns the two drive belts in reverse respectively to slow down the flow rate of garbage conveyed to the disposal box into the conveying hollow cylinder, so that a certain time is reserved for the magnet to absorb metal in the garbage; then the metal absorbed by the magnet under the action of the drive belt is conveyed to the inside of the clamping plate, and the metal adsorbed by the magnet is accumulated inside through the clamping plate; when a larger amount of metal is accumulated, the adsorption force of the magnet for the metal located on the outside decreases, so that the metal falls into the collection box along the clamping plate. Therefore, users can collect the metal without turning off the device.

In the present invention, the second crushing knife is set at an angle to divert the falling garbage to the front and rear sides, so that the two first crushing knives and the second crushing knife cooperate to crush the garbage respectively to avoid excessive accumulation of garbage, otherwise the knife may be stuck.

In the present invention, the two-way motor that rotates counterclockwise drives the drive rod counterclockwise, so that the conveying hollow cylinder drives the gear ring counterclockwise; at this time, the outer and inner rings of the one-way bearing rotate at the same time, so that the reciprocating screw rod rotates and drives the sealing plate to move towards the left and open the conveying pipe; the broken garbage inside is discharged into the designated treated foundation pit for landfill, and then the reciprocating screw rod continues to rotate and resets the sealing plate to block the conveying pipe and complete the discharge of the device, which is easy and convenient.

Figure 1:
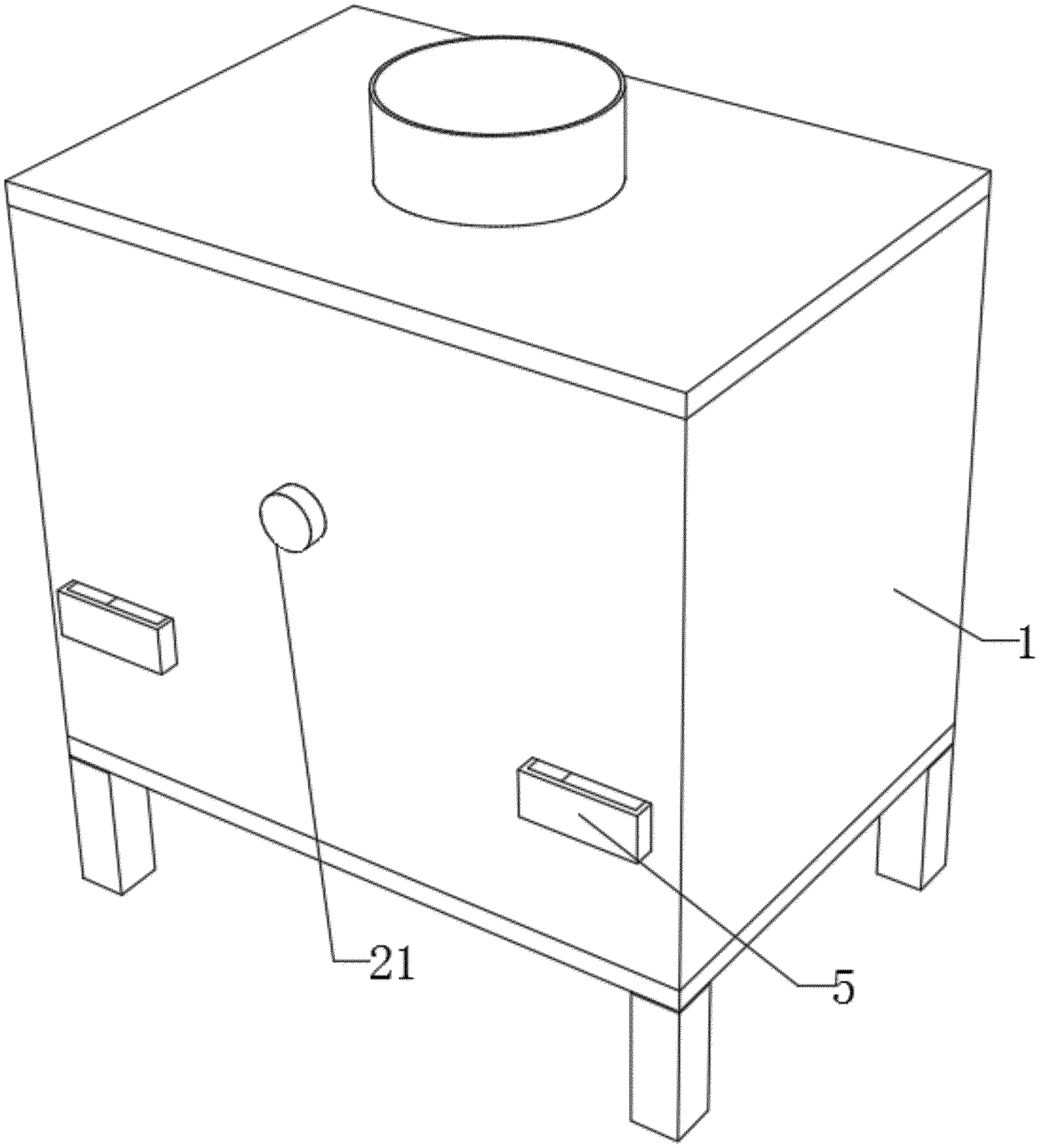
FIG. 1 is the three-dimensional structure diagram of the present invention.

In the figures: 1. Disposal box; 2. Screening mechanism; 21. Two-way motor; 22. Double-thread worm; 23. Drive belt; 24. Magnet; 25. Rotating rod; 26. Clamping plate; 27. Round rod; 28. Drive gear; 3. Crushing mechanism; 31. Drive rod; 32. Worm gear; 33. First crushing knife; 4. Discharge mechanism; 41. Stirring rod; 42. Second crushing knife; 43. Conveying hollow cylinder; 44. Conveying pipe; 45. Reciprocating screw rod; 46. Sealing plate; 47. One-way bearing; 48. Drive gear; 49. Gear ring; 410. Belt; 5. Collection box; 6. Deflector

EMBODIMENTS

A clear and complete description of the technical solutions in the embodiments of the present invention will be given below, in conjunction with the drawings corresponding to the embodiments of the present invention. Apparently, the embodiments described are some, but not all of the embodiments of the present invention. All of the other embodiments, obtained by those of ordinary skill in the art on the basis of the embodiments of the present invention without any inventive efforts, fall into the protection scope of the present invention.

Please refer to FIGS. 1 to 5. The present invention provides a technical solution: A classified landfill device for garbage landfills comprises a disposal box (1), and the front of the disposal box (1) is fixedly connected with the screening mechanism (2); the side drive of the screening mechanism (2) is connected with the crushing mechanism (3), and the bottom drive of the crushing mechanism (3) is connected with the discharge mechanism (4);

The front and rear sides of the inner wall of the disposal box (1) are fixedly connected with deflectors (6).

Figure 2:
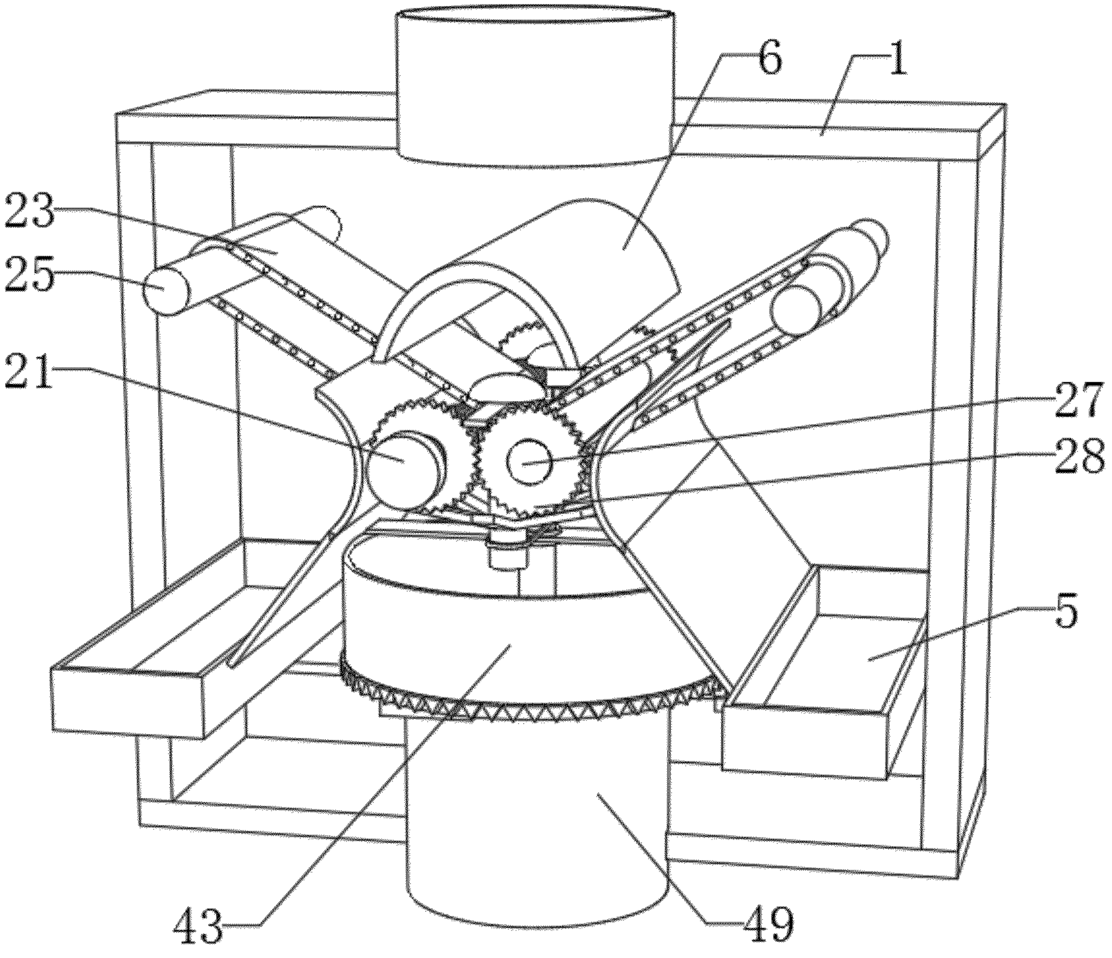
FIG. 2 is a three-dimensional structure profile of the present invention.
Figure 3:
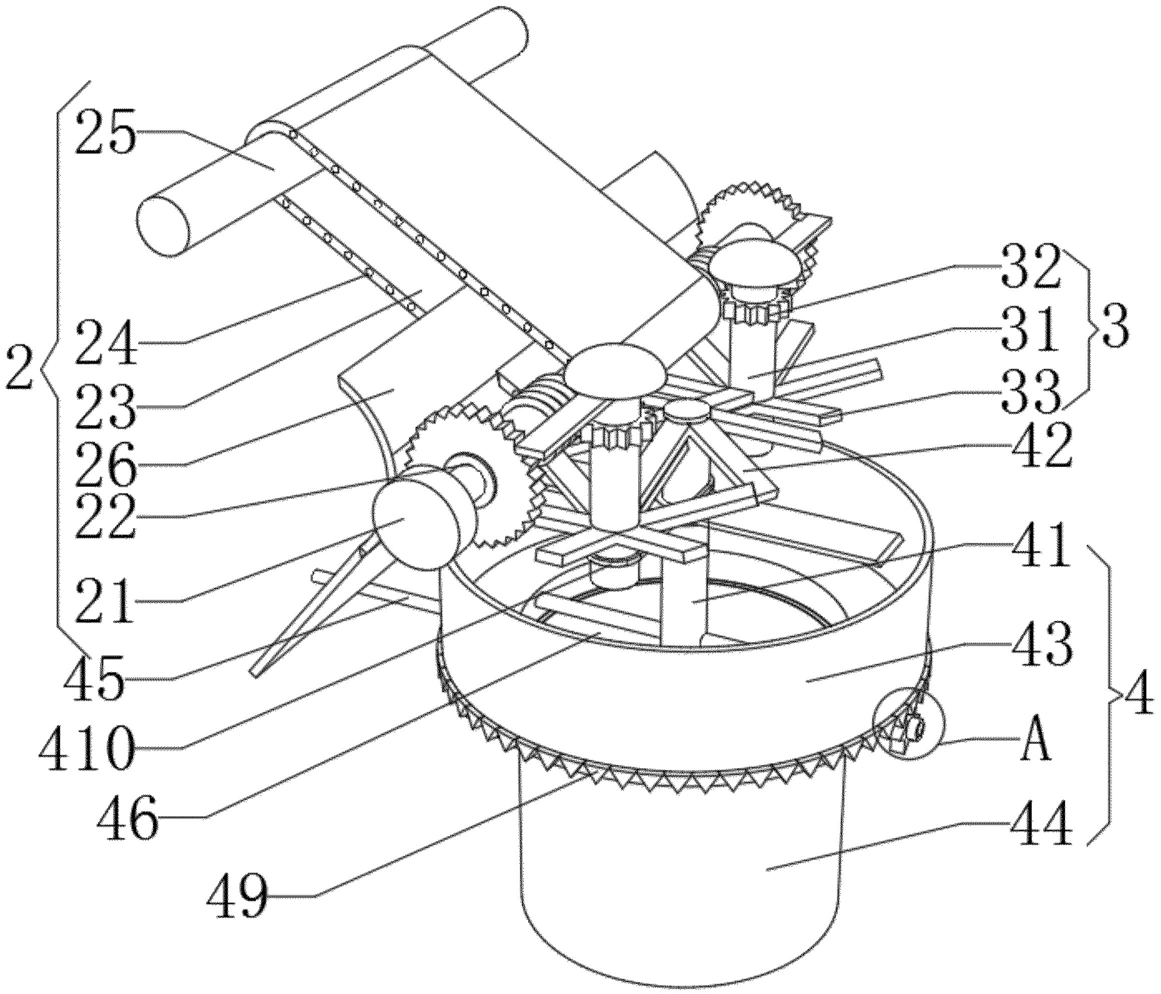
FIG. 3 is a three-dimensional structure diagram of the screening mechanism of the present invention.
Figure 4:
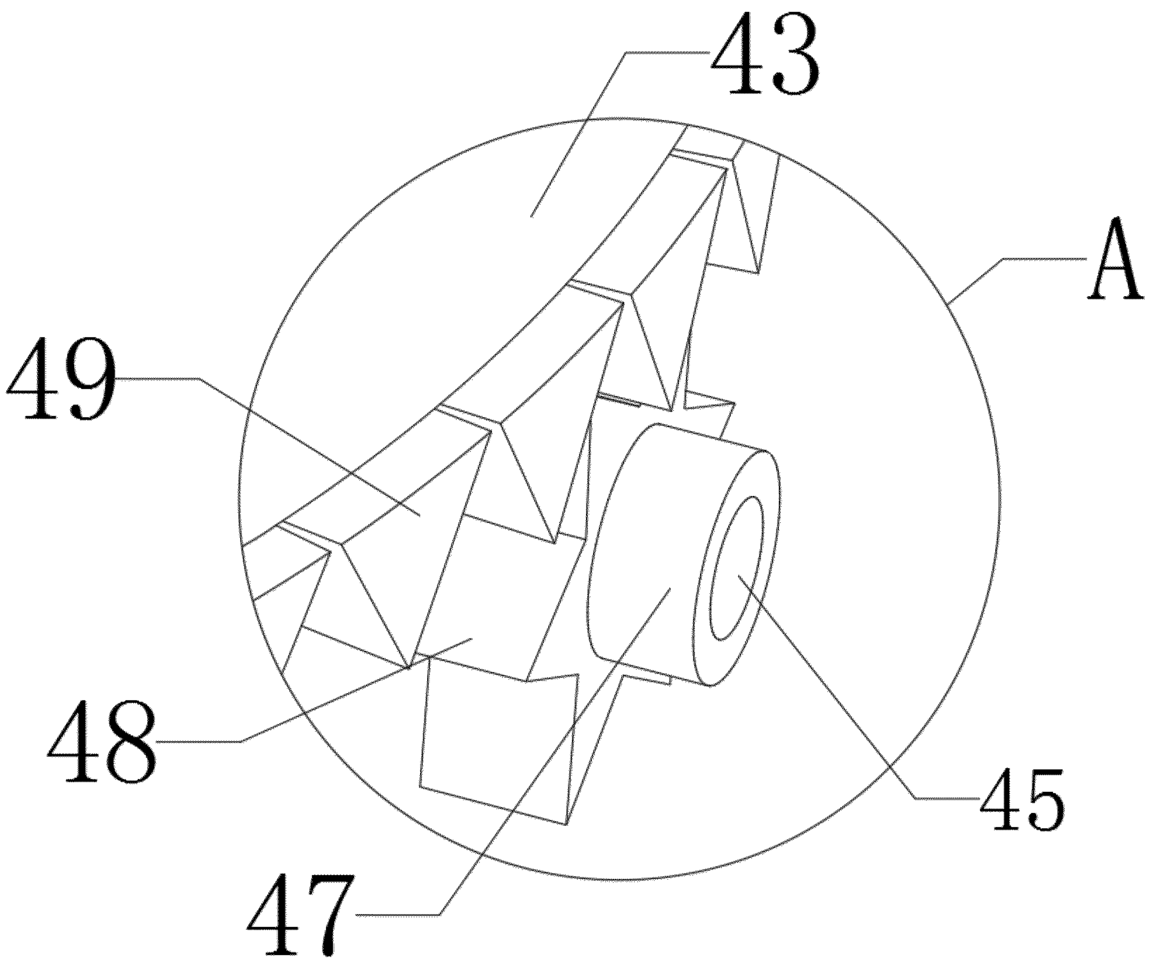
FIG. 4 is an enlarged view of the structure at A in FIG. 3 of the present invention.

In this embodiment, as shown in FIGS. 1, 2 and 3, the screening mechanism (2) comprises a two-way motor (21) and round rod (27), of which the front and rear ends of the round rod (27) are rotatably connected with the front and rear sides of the inner wall of the disposal box (1) respectively, and the two-way motor (21) is fixed on the front of the disposal box (1); one end of the rotating shaft of the two-way motor (21) extends to the inside of the disposal box (1) and is fixedly connected with the double-thread worm (22); the sides of the double-thread worm (22) and the round rod (27) are sleeved with the drive belt (23), and the drive belt (23) is internally provided with magnet (24);

The sides of the double-thread worm (22) and the round rod (27) are fixedly sleeved with the drive wheel (28), and the two drive wheels (28) are engaged with each other.

The insides of the two drive belts (23) are overlapped with rotating rods (25), and the two ends of the rotating rods (25) are rotatably connected with the front and rear sides of the inner wall of the disposal box (1) respectively; the lateral movable sleeve of the drive belt (23) is provided with clamping plate (26), and the front and rear sides of the clamping plate (26) are fixedly connected with the front and rear sides of the inner wall of the disposal box (1) respectively.

In this embodiment, as shown in FIG. 3, the crushing mechanism (3) comprises drive rod (31), and the side of the drive rod (31) is fixedly sleeved with the worm wheel (32); the side of the worm wheel (32) is engaged with the double-thread worm (22), and the side of the drive rod (31) is rotatablely connected with the inner wall of the disposal box (1); the side of the drive rod (31) is fixedly connected with the first crushing knife (33).

In this embodiment, as shown in FIGS. 2, 3, 4 and 5, the discharge mechanism (4) comprises a stirring rod (41), and the side of the stirring rod (41) is rotatably connected with the side of the clamping plate (26); the side of the stirring rod (41) and the side of the drive rod (31) at the front side are sleeved with the belt (410), and the side of the stirring rod (41) is fixedly connected with the second crushing knife (42).

The bottom surface of the stirring rod (41) is fixedly connected with the conveying hollow cylinder (43), and the bottom surface of the conveying hollow cylinder (43) is rotatably connected with the conveying pipe (44); the conveying pipe (44) is fixedly inserted on the bottom surface of the inner wall of the disposal box (1), and the side of the conveying pipe (44) is rotatably connected with the reciprocating screw rod (45); the side of the reciprocating screw rod (45) is provided with sealing plate (46), and the sealing plate (46) is movably inserted on the side of the conveying pipe (44); the side of the reciprocating screw rod (45) is fixedly sleeved with the one-way bearing (47), and the side of the one-way bearing (47) is fixedly sleeved with the drive gear (48); the side of the drive gear (48) is rotatably connected with the gear ring (49), and the ring gear (49) is fixedly connected to the bottom surface of the conveying pipe (44).

In this embodiment, as shown in FIG. 3, the left and right sides of the front of the disposal box (1) are movably connected with the collection box (5), and the side of the collection box (5) is overlapped with the side of the clamping plate (26). The collection box (5) collects the metal scraped off by the clamping plate (26).

In this embodiment, as shown in FIG. 3, the clamping plate (26) is L-shaped, and the inside of the clamping plate (26) is provided with a chute. The metal absorbed by the magnet (24) on the drive belt (23) is scrapped off by the clamping plate (26).

Figure 5:
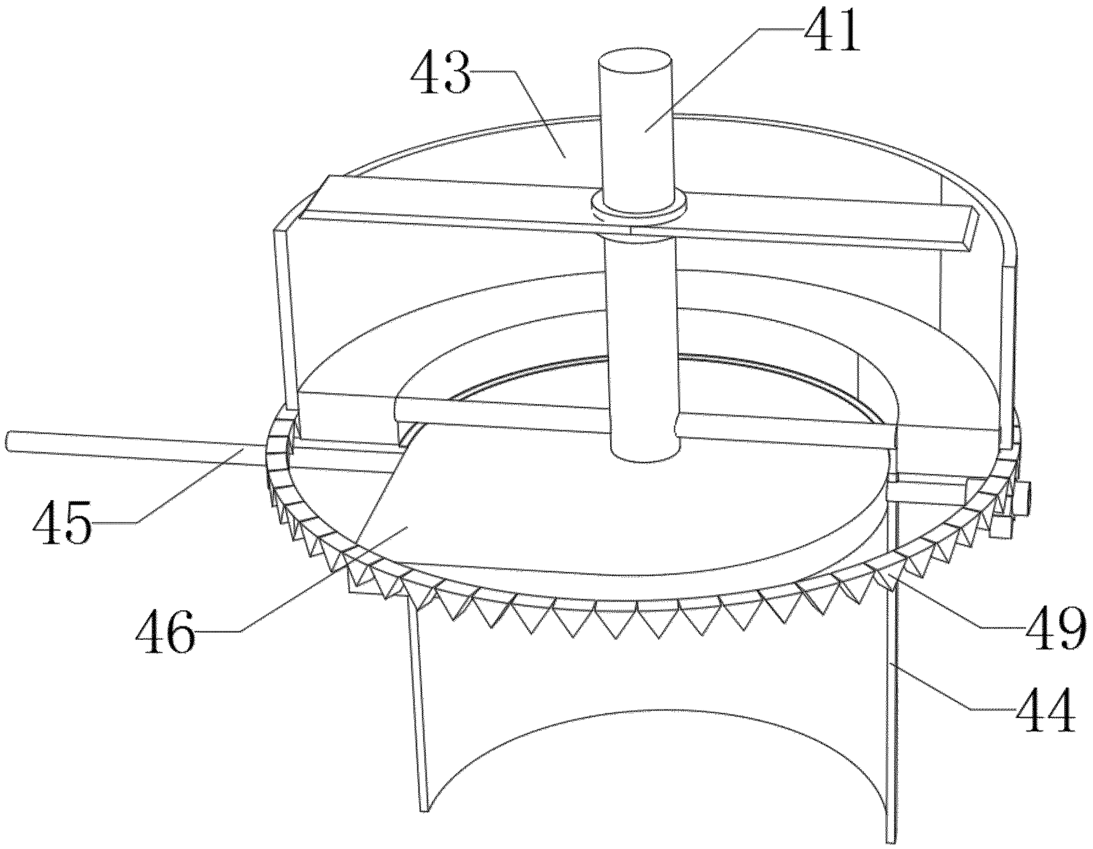
FIG. 5 is a three-dimensional structure profile of the discharging mechanism of the present invention.

In this embodiment, as shown in FIGS. 3 and 5, the side of the stirring rod (41) is fixedly sleeved with the fixed bearing, and the outside of the fixed bearing is fixedly connected to the side of the clamping plate (26). The friction force between the stirring rod (41) and the clamping plate (26) is reduced by fixed bearing.

Method and advantage of the present invention: a method for using a classified landfill device for garbage landfills comprises the following steps:

As shown in FIGS. 1, 2, 3, 4, and 5:

S1: Garbage that needs to be landfilled is conveyed to the inside of the disposal box (1); the two-way motor (21) drives the double-thread worm (22) counterclockwise, and then the drive wheel (28) on the side of the double-thread worm (22) drives the other drive wheel (28) clockwise; the screw rotating rod (25) turns the two drive belts (23) in reverse respectively to slow down the flow rate of garbage conveyed to the disposal box (1) into the conveying hollow cylinder (43), so that a certain time is reserved for the magnet (24) to absorb metal in the garbage; then the metal absorbed by the magnet (24) under the action of the drive belt (23) is conveyed to the inside of the clamping plate (26), and the metal adsorbed by the magnet (24) is accumulated inside through the clamping plate (26); when a larger amount of metal is accumulated, the adsorption force of the magnet (24) for the metal located on the outside decreases, so that the metal falls into the collection box (5) along the clamping plate (26);

S2: The garbage absorbed and screened by the magnet (24) is conveyed to the upper side of the conveying hollow cylinder (43), and then the double-thread worm (22) drives the two first crushing knives (33) clockwise; at this time, the conveying hollow cylinder (43) drives the gear ring (49) clockwise, and then drives the drive gear (48) counterclockwise; then, the outer ring of the one-way bearing (47) rotates, but its inner ring does not rotate, in which case the reciprocating screw rod (45)) does not rotate; the front drive rod (31) drives the stirring rod (41) and the second crushing knife (42) on its side, and the second crushing knife (42) is set at an angle to divert the falling garbage to the front and rear sides, so that the two first crushing knives (33) and the second crushing knife (42) cooperate to crush the garbage respectively to avoid excessive accumulation of garbage, otherwise the knife is stuck; the crushed garbage falls into the conveying hollow cylinder (43), after the device has crushed the specified amount of garbage;

S3: The two-way motor (21) that rotates counterclockwise cooperates with the double-thread worm (22), the drive rod (31) and other structures to drive the drive rod (41) counterclockwise, so that the conveying hollow cylinder (43) drives the gear ring (49) counterclockwise; at this time, the outer and inner rings of the one-way bearing (47) rotate at the same time, so that the reciprocating screw rod (45) rotates and drives the sealing plate (46) to move towards the left and open the conveying pipe (44); the broken garbage inside is discharged into the designated treated foundation pit for landfill, and then the reciprocating screw rod (45) continues to rotate and resets the sealing plate (46) to block the conveying pipe (44) and complete the discharge of the device.

The basic principles, main features and advantages of the present invention have been shown and described above. Those skilled in the art should understand that the present invention is not limited by the above-mentioned embodiments, and those described in the above embodiments and description are only preferred examples of the present invention, and are not intended to limit the present invention, without departing from the spirit and scope of the present invention. The present invention will also have various changes and improvements, and these changes and improvements all fall within the protection scope of the present invention. The protection scope of the present invention is defined by the appended claims and their equivalents.

What is claimed is:

1. A classified landfill device for garbage landfills, comprising a disposal box (1), comprising: a front of the disposal box (1) is fixedly connected with a screening mechanism (2); a side drive of the screening mechanism (2) is connected with a crushing mechanism (3), and a bottom drive of the crushing mechanism (3) is connected with a discharge mechanism (4);

the front and rear sides of an inner wall of the disposal box (1) are fixedly connected with deflectors (6);

the screening mechanism (2) comprises a two-way motor (21) and a round rod (27), of which the front and rear ends of the round rod (27) are rotatably connected with the front and rear sides of the inner wall of the disposal box (1) respectively, and the two-way motor (21) is fixed on the front of the disposal box (1); one end of a rotating shaft of the two-way motor (21) extends to inside of the disposal box (1) and is fixedly connected with a double-thread worm (22); sides of the double-thread worm (22) and the round rod (27) are sleeved with a drive belt (23), and the drive belt (23) is internally provided with a magnet (24);

the sides of the double-thread worm (22) and the round rod (27) are fixedly sleeved with a drive wheel (28), and two drive wheels (28) are engaged with each other;

the insides of two drive belts (23) are overlapped with rotating rods (25), and the two ends of the rotating rods (25) are rotatably connected with the front and rear sides of the inner wall of the disposal box (1) respectively; a lateral movable sleeve of the drive belt (23) is provided with a clamping plate (26), and the front and rear sides of the clamping plate (26) are fixedly connected with the front and rear sides of the inner wall of the disposal box (1) respectively;

the crushing mechanism (3) comprises a drive rod (31), and the side of the drive rod (31) is fixedly sleeved with a worm gear (32); the side of the worm gear (32) is engaged with the double-thread worm (22), and the side of the drive rod (31) is rotatably connected with the inner wall of the disposal box (1); the side of the drive rod (31) is fixedly connected with a first crushing knife (33);

the discharge mechanism (4) comprises a stirring rod (41), and the side of the stirring rod (41) is rotatably connected with the side of the clamping plate (26); the side of the stirring rod (41) and the side of the drive rod (31) at the front side are sleeved with a belt (410), and the side of the stirring rod (41) is fixedly connected with a second crushing knife (42);

the bottom surface of the stirring rod (41) is fixedly connected with a conveying hollow cylinder (43), and the bottom surface of the conveying hollow cylinder (43) is rotatably connected with a conveying pipe (44); the conveying pipe (44) is fixedly inserted on the bottom surface of the inner wall of the disposal box (1), and the side of the conveying pipe (44) is rotatably connected with a reciprocating screw rod (45); the side of the reciprocating screw rod (45) is provided with a sealing plate (46), and the sealing plate (46) is movably inserted on the side of the conveying pipe (44); the side of the reciprocating screw rod (45) is fixedly sleeved with a one-way bearing (47), and the side of the one-way bearing (47) is fixedly sleeved with a drive gear (48); the side of the drive gear (48) is rotatably connected with a gear ring (49), and the ring gear (49) is fixedly connected to the bottom surface of the conveying pipe (44).

2. A classified landfill device for garbage landfills according to claim 1, further comprising: the left and right sides of the front of the disposal box (1) are movably connected with a collection box (5), and the side of the collection box (5) is overlapped with the side of the clamping plate (26).

3. A classified landfill device for garbage landfills according to claim 1, further comprising: the clamping plate (26) is L-shaped, and the inside of the clamping plate (26) is provided with a chute.

4. A classified landfill device for garbage landfills according to claim 1, further comprising: the side of the stirring rod (41) is fixedly sleeved with a fixed bearing, and the outside of the fixed bearing is fixedly connected to the side of the clamping plate (26).

5. A method for using a classified landfill device for garbage landfills, comprising the following steps:

S1: garbage that needs to be landfilled is conveyed to the inside of a disposal box (1); a two-way motor (21) drives a double-thread worm (22) counterclockwise, and then a drive wheel (28) on the side of the double-thread worm (22) drives a second drive wheel (28) clockwise; a screw rotating rod (25) turns two drive belts (23) in reverse respectively to slow down a flow rate of garbage conveyed to the disposal box (1) into a conveying hollow cylinder (43), so that a certain time is reserved for a magnet (24) to absorb metal in the garbage; then the metal absorbed by the magnet (24) under the action of a drive belt (23) is conveyed to the inside of a clamping plate (26), and the metal adsorbed by the magnet (24) is accumulated inside through the clamping plate (26); when a larger amount of metal is accumulated, the adsorption force of the magnet (24) for the metal located on the outside decreases, so that the metal falls into a collection box (5) along the clamping plate (26);

S2: the garbage absorbed and screened by the magnet (24) is conveyed to the upper side of the conveying hollow cylinder (43), and then the double-thread worm (22) drives two first crushing knives (33) clockwise; at this time, the conveying hollow cylinder (43) drives a gear ring (49) clockwise, and then drives a drive gear (48) counterclockwise; then, the outer ring of a one-way bearing (47) rotates, but its inner ring does not rotate, in which case a reciprocating screw rod (45) does not rotate; a front drive rod (31) drives a stirring rod (41) and the second crushing knife (42) on its side, and a second crushing knife (42) is set at an angle to divert the falling garbage to the front and rear sides, so that the two first crushing knives (33) and the second crushing knife (42) cooperate to crush the garbage respectively to avoid excessive accumulation of garbage, otherwise the knife may be stuck; crushed garbage falls into the conveying hollow cylinder (43), after the device has crushed the specified amount of garbage;

S3: the two-way motor (21) that rotates counterclockwise drives the stirring rod (41) counterclockwise, so that the conveying hollow cylinder (43) drives the gear ring (49) counterclockwise; at this time, the outer and inner rings of the one-way bearing (47) rotate at the same time, so that the reciprocating screw rod (45) rotates and drives a sealing plate (46) to move towards the left and open a conveying pipe (44); the broken garbage inside is discharged into a designated treated foundation pit for landfill, and then the reciprocating screw rod (45) continues to rotate and resets the sealing plate (46) to block the conveying pipe (44) and complete the discharge of the device.

* * * * *